2,739,072

PAINT MATERIALS AND METHODS OF MAKING THE SAME

Cecil Robinson, Mountain View, and Henry E. Hancock, Kansas City, Mo., assignors to Tri Foods Company, Springfield, Mo., a corporation of Missouri No Drawing. Application November 28, 1952, Serial No. 323,132

14 Claims. (Cl. 106—253)

This invention relates in general to certain new and useful improvements in paint materials and methods of making the same.

It is the primary object of the present invention to provide paint materials and methods for making the same which are extremely economical and convenient and which can be employed with a minimum of expense for labor and cost of materials.

It is a further object of the present invention to provide a paint material which is extremely inexpensive as compared with conventional paint materials and which is unusually long-lasting and durable.

It is a further object of the present invention to provide a paint material which will preserve the surface upon which it is applied under extremely adverse conditions and particularly in moist, steamy atmospheres, such as encountered in industrial plants and similar places.

It is an additional object of the present invention to provide a paint material which may be used in food processing plants and similar locations and will be extremely effective in the inhibiting of mold growth and other bacterial films upon the surface which is coated with the paint material of the present invention.

With the above and other objects in view, our invention resides in the novel processes and compositions of matter presently described and pointed out in the claims.

Broadly speaking, the present invention comprises the fermentation of liquid whey resulting from cheesemaking and similar operations until the lactic acid content of the whey is sufficient within limits determined in accordance with the present invention. This fermentation must be carried out under very sanitary and precisely controlled conditions to produce a relatively high acidity while preventing the introduction of foreign bacteria, yeasts, and the like and also preventing any putrefaction of the whey. Thereupon, drying oils or other substances ordinarily used in paint vehicles, such as varnishes and similar solutions of natural or synthetic resins, are emulsified therein to form a vehicle into which the necessary or desired amount of pigments may be ground. The paint material resulting has been found to be extremely long-lasting and durable and to have desirable mold-inhibiting properties so that the growth of mold spores, bacteria, and other deleterious organisms encountered in food processing plants will be very materially suppressed upon surfaces which have been protectively covered by the paint material of the present invention.

By way of illustration, and not by way of limitation, the following specific example is illustrative of the present invention:

Liquid whey of the type conventionally and ordinarily resulting from cheese manufacture is placed in a substantially sterile vessel and allowed to ferment in a closed room having precisely controlled temperature and humidity. The optimum conditions have been found to be a temperature ranging from 80° to 100° F. and a relative humidity in excess of 60%. Care should be observed not to exceed a temperature of 100° F. The fermentation is continued until the lactic acid content of the whey is relatively high. As will be familiar to persons skilled in the cheese-making industry, ordinary whey has an acidity content ranging from 0.16% to 0.20% as it results from ordinary cheese-making operations. For purposes of the present invention, however, the whey should be fermented until the lactic acid content is from 1% to 2%. It has been found that a lactic acid content either smaller or greater than this specified range is undesirable. When the lactic acid content has reached the desired level, the whey is cooled and is ready for use. As long as the fermented whey is kept at room temperature and foreign matter is excluded, the whey will remain stable.

Nine pounds barytes and five pounds titanox are ground into one gallon of linseed oil to form a smooth paste. To this paste are added successively one pint of Japan drier, one pint mineral spirits (oleum) and finally one and one half (1½) gallons of the fermented whey. If desired, there may be added one pint to one quart of a varnish consisting of two parts tung oil, one part modified phenolic resin, and three parts mineral spirits.

The above formula will produce approximately 3¼ to 3½ gallons of white paint of proper consistency for brush application. It should be understood in this connection that comparable quantities of white lead paste, white lead, or other pigments may be used. For example, in the above specific illustration approximately fifteen to sixteen pounds of conventional white lead paste may be substituted for the fourteen pounds of pigment therein set forth.

The white paint thus produced has excellent covering power, is extremely economical in cost of materials, and can be readily brushed upon any surface to which conventional paint can be applied. Where it is desired to apply the paint material of the present invention by the use of an air brush or spray, the viscosity of the paint material may be reduced to the desired extent by the addition of a further quantity of mineral spirit. Turpentine, however, should not be used as a thinner. Colored pigments and paint making oils other than linseed oil can also be used. Similarly, varnishes other than tung oil varnish may be used so long as they do not contain turpentine. Furthermore, the white paints resulting from the present invention may be tinted with tinting pastes made from pigments ground in linseed oil.

It should be understood that changes in the methods, compositions, and combination above set forth may be made without departing from the nature and principle of our invention.

Having thus described our invention, what we claim and desire to secure by Letters Patent is:

1. A paint vehicle consisting of whey having a lactic acid content ranging from 1% to 2%, and a vegetable drying oil.

2. A paint vehicle consisting of fermented whey having a lactic acid content ranging from 1% to 2%, and a vegetable drying oil.

3. A paint vehicle consisting of whey having a lactic acid content ranging from 1% to 2%, and linseed oil.

4. A paint vehicle consisting of whey having a lactic acid content ranging from 1% to 2%, and chinawood oil.

5. A paint vehicle consisting of a vegetable drying oil, and whey containing not less than 1% and not more than 2% of lactic acid by weight.

6. A paint material consisting of whey having a lactic acid content ranging from 1% to 2%, pigment, and a vegetable drying oil.

7. A paint material comprising whey having a lactic acid content ranging from 1% to 2%, a pigment, Japan drier, and a vegetable drying oil.

8. A paint material comprising barytes, titanium dioxide, whey having a lactic acid content ranging from 1% to 2%, and an unsaturated vegetable oil.

9. A paint material comprising barytes, titanium dioxide, whey having a lactic acid content ranging from 1% to 2%, and a vegetable drying oil.

10. The method of making a paint vehicle which comprises fermenting whey by subjecting it to a temperature in the range of 80° F. to 100° F. and a relative humidity in excess of 60% until the lactic acid content thereof reaches the range of 1% to 2%, mixing said whey having a lactic acid content of 1% to 2% with a vegetable drying oil while stirring vigorously to form a smooth emulsion.

11. The method of making a paint vehicle which comprises fermenting whey at a temperature ranging from 80° F. to 100° F. until the lactic acid content reaches a range of 1% to 2%, thereupon adding a vegetable drying oil while stirring vigorously to form a smooth emulsion.

12. A paint material consisting essentially of fermented whey, linseed oil, and pigment in substantially the following proportions:

| | Pounds |
|---|---|
| Fermented liquid whey having a lactic acid content ranging from 1% to 2% | 12 |
| Linseed oil | 9 |
| Pigment | 14 |

13. A paint material consisting essentially of fermented whey, linseed oil, barytes and titanox in substantially the following proportions:

| | Pounds |
|---|---|
| Fermented liquid whey having a lactic acid content ranging from 1% to 2% | 12 |
| Linseed oil | 9 |
| Barytes | 9 |
| Titanox | 5 |

14. A paint material consisting essentially of fermented whey, linseed oil, and white lead paste in substantially the following proportions:

| | Pounds |
|---|---|
| Fermented liquid whey having a lactic acid content ranging from 1% to 2% | 12 |
| Linseed oil | 9 |
| White lead paste | 14 |

References Cited in the file of this patent

UNITED STATES PATENTS

| 732,894 | Ruston | July 7, 1903 |
| 1,189,841 | Sebreil | July 4, 1916 |
| 1,726,768 | Robinson | Sept. 3, 1929 |
| 2,167,752 | Hartford | Aug. 1, 1939 |
| 2,246,983 | Oberg | June 24, 1941 |

OTHER REFERENCES

"Yearbook Dept. of Agriculture" for 1897, pp. 509–528 inclusive.

Hunziker's "Condensed Milk," Illinois, 1949, pp. 211–216.